US009426789B2

(12) United States Patent
Fujita

(10) Patent No.: US 9,426,789 B2
(45) Date of Patent: Aug. 23, 2016

(54) WIRELESS COMMUNICATION SYSTEM, METHOD FOR CONTROLLING WIRELESS COMMUNICATION SYSTEM, BASE STATION, AND MOBILE STATION

(71) Applicant: KYOCERA CORPORATION, Kyoto (JP)

(72) Inventor: Hiroki Fujita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 52 days.

(21) Appl. No.: 14/360,807

(22) PCT Filed: Nov. 9, 2012

(86) PCT No.: PCT/JP2012/007219
§ 371 (c)(1),
(2) Date: May 27, 2014

(87) PCT Pub. No.: WO2013/080457
PCT Pub. Date: Jun. 6, 2013

(65) Prior Publication Data
US 2014/0341142 A1    Nov. 20, 2014

(30) Foreign Application Priority Data
Nov. 28, 2011  (JP) .................................. 2011-259522

(51) Int. Cl.
*H04W 72/04*   (2009.01)
*H04L 5/00*    (2006.01)
(Continued)

(52) U.S. Cl.
CPC ....... *H04W 72/0413* (2013.01); *H04B 7/0404* (2013.01); *H04L 5/0023* (2013.01);
(Continued)

(58) Field of Classification Search
CPC .................................................. H04W 72/0413
USPC ......................................................... 370/329
See application file for complete search history.

(56) References Cited

U.S. PATENT DOCUMENTS

| 6,192,217 B1 * | 2/2001 | Farrell | ............... H04B 7/18519 455/12.1 |
| 6,369,758 B1 * | 4/2002 | Zhang | .................. H04B 7/0851 342/378 |

(Continued)

FOREIGN PATENT DOCUMENTS

| JP | 2010-177932 A | 8/2010 |
| JP | 2011-166385 A | 8/2011 |
| WO | 2011-132262 A1 | 10/2011 |

OTHER PUBLICATIONS

International Search Report; PCT/JP2012/007219; Jan. 29, 2013.

*Primary Examiner* — Melvin Marcelo
*Assistant Examiner* — Peter Solinsky
(74) *Attorney, Agent, or Firm* — Studebaker & Brackett PC

(57) ABSTRACT

Provided is, in wireless communication systems such as TD-LTE where there might be difference in frequency band allocated to a mobile station between uplink and downlink, a wireless communication system which is capable of ensuring desired antenna directivity by the mobile station controlling an adaptive array antenna, such a method for controlling a wireless communication system, such a base station, and such a mobile station. The mobile station transmits to the base station a message indicating that the self station includes an adaptive array antenna. Upon receiving the message, the base station assigns a downlink resource block and an uplink resource block following the downlink resource block allocated to the mobile station within the same frequency band. The mobile station 1 controls the adaptive array antenna based on a signal received using the allocated downlink resource block and transmits a signal using the allocated uplink resource block.

6 Claims, 8 Drawing Sheets

(51) Int. Cl.
  *H04L 5/14* (2006.01)
  *H04B 7/04* (2006.01)
  *H04W 16/28* (2009.01)
  *H04B 7/06* (2006.01)

(52) U.S. Cl.
  CPC ............ *H04L5/0037* (2013.01); *H04L 5/0058* (2013.01); *H04L 5/1469* (2013.01); *H04W 72/048* (2013.01); *H04B 7/0615* (2013.01); *H04W 16/28* (2013.01); *H04W 72/0453* (2013.01)

(56) References Cited

U.S. PATENT DOCUMENTS

| | | | |
|---|---|---|---|
| 7,158,493 B1* | 1/2007 | Uhlik | H04W 48/12 370/320 |
| 2002/0146995 A1* | 10/2002 | McLain | H04B 7/18513 455/296 |
| 2002/0150182 A1* | 10/2002 | Dogan | H04L 27/18 375/343 |
| 2003/0169722 A1* | 9/2003 | Petrus | H04B 7/2659 370/347 |
| 2005/0192059 A1* | 9/2005 | Proctor | H01Q 1/242 455/562.1 |
| 2009/0175232 A1* | 7/2009 | Kolding | H04L 1/0027 370/329 |
| 2009/0207549 A1* | 8/2009 | Shimanouchi | H01G 5/16 361/281 |
| 2010/0056234 A1* | 3/2010 | Yamamoto | H01Q 1/243 455/575.7 |
| 2010/0150013 A1* | 6/2010 | Hara | H04L 25/0224 370/252 |
| 2011/0281614 A1 | 11/2011 | Kitahara | |
| 2011/0305212 A1* | 12/2011 | Miyatake | H04L 1/1812 370/329 |
| 2012/0296567 A1* | 11/2012 | Breed | G01C 21/26 701/468 |
| 2012/0299765 A1* | 11/2012 | Huang | H01Q 3/24 342/81 |
| 2013/0114559 A1* | 5/2013 | Fujimoto | H04W 72/04 370/329 |
| 2013/0217450 A1* | 8/2013 | Kanj | H01Q 1/242 455/575.7 |
| 2014/0177490 A1* | 6/2014 | Sahara | H04L 5/00 370/280 |

* cited by examiner

WIRELESS COMMUNICATION SYSTEM, METHOD FOR CONTROLLING WIRELESS COMMUNICATION SYSTEM, BASE STATION, AND MOBILE STATION

CROSS-REFERENCES TO RELATED APPLICATIONS

This application claims priority to and the benefit of Japanese Patent Application No. 2011-259522 filed on Nov. 28, 2011, the entire contents of which are incorporated herein by reference.

TECHNICAL FIELD

The present invention relates to a wireless communication system including a mobile station that controls an AAS (Adaptive Array Antenna System), a method for controlling a wireless communication system, a base station, and a mobile station.

BACKGROUND

In conventional wireless communication systems such as TD-LTE, a base station (eNB: eNodeB) allocates a mobile station (UE: UserEquipment) resources separately for an uplink and a downlink. (Refer to Patent Literature 1, for example.)

FIG. 7 is a schematic diagram illustrating allocation of resource blocks by a base station 102 in a conventional wireless communication system. The base station 102 allocates respective resource blocks in frequency bands a-d for subframes 131-140 to a mobile station connected to the base station 102. Among the subframes 131-140, the subframe 132 and the subframe 137 are special subframes. The special subframes refer to subframes used for switching from a downlink to an uplink. The remaining subframes are normal subframes.

FIG. 7 illustrates the resource blocks that the base station 102 allocates to the mobile station 101. The base station 102 allocates, for the subframe 131, the resource blocks 151 and 152 to the mobile station 101. The base station 102 also allocates, for the subframe 133, the resource block 153 to the mobile station 101. The base station 102 also allocates, for the subframe 134, the resource block 154 to the mobile station 101. The base station 102 similarly allocates the resource blocks for the subframes 135-140.

Here, the base station 102 separately allocates the uplink and the downlink resource blocks without associating the uplink resource blocks with the downlink resource blocks. Accordingly, the frequency bands of the uplink resource blocks sometimes differ from the frequency bands of the downlink resource blocks. In details, in FIG. 7, the frequency bands of the resource block 151 and the resource block 152 are the frequency band a and the frequency band b. On the other hand, the frequency bands of the resource block 153 and the resource block 154 that follow are the frequency band c and the frequency band d which differ from those in the downlink.

CITATION LIST

Patent Literature

Patent Literature 1: Japanese Patent Application Publication No. 2010-177932

SUMMARY OF INVENTION

Technical Problem

When the mobile station 101 includes an adaptive array antenna, and the mobile station 101 controls the adaptive array antenna, the mobile station 101 calculates an antenna weight based on a signal in a downlink. The mobile station 101 transmits a signal in an uplink according to the calculated antenna weight. However, since antenna weights depend on frequency band, when there is difference in the frequency band between the downlink and the uplink, desired antenna directivity may not be achieved. As illustrated in a schematic diagram of FIG. 8, even when attempting to implement antenna beam forming toward the base station 102, the mobile station 101 ends up with beam forming in a wrong direction.

That is to say, in conventional wireless systems such as TD-LTE where there might be a difference in the frequency band allocated to a mobile station between the uplink and the downlink, it was not possible to ensure desired antenna directivity by controlling the adaptive array antenna in the mobile station 101.

Thus, in view of the above problem, the present invention is to provide, in wireless communication systems such as TD-LTE where there might be a difference in the frequency band allocated to a mobile station between the uplink and the downlink, a wireless communication system which is capable of ensuring desired antenna directivity by the mobile station controlling the adaptive array antenna, such a method for controlling a wireless communication system, such a base station, and such a mobile station.

Solution to Problem

A first aspect of the present invention for solving the above problem resides in a wireless communication system which includes a mobile station and a base station and in which there might be a difference in a frequency band between a downlink resource and an uplink resource allocated to the mobile station, the mobile station including an adaptive array antenna. In the wireless communication system, the mobile station transmits to the base station a message indicating that the mobile station includes the adaptive array antenna. Upon receiving the message, the base station assigns the same frequency band as a frequency band of a downlink resource block to be a frequency band of an uplink resource block following the downlink resource block, the downlink resource block and the uplink resource block being allocated to the mobile station. The mobile station controls the adaptive array antenna based on a signal received by using the allocated downlink resource block and transmits a signal by using the allocated uplink resource block.

A second aspect of the present invention resides in the wireless communication system of the first aspect, wherein the allocated uplink resource block is an uplink resource block for a normal subframe that immediately follows a subframe of the allocated downlink resource block.

A third aspect of the present invention resides in a method for controlling a wireless communication system which includes a mobile station and a base station and in which there might be a difference in a frequency band between a downlink resource and an uplink resource allocated to the mobile station, the mobile station including an adaptive array antenna, the method including: the step, performed by the mobile station, of transmitting to the base station a message indicating that the mobile station includes the adaptive array antenna; the step, performed by the base station upon receiving the message, of assigning the same frequency band as a frequency band of a downlink resource block to be a frequency band of an uplink resource block following the downlink resource block, the downlink resource block and the uplink resource block being allocated to the mobile station; and the step, performed by the mobile station, of controlling the adaptive array antenna based on a signal received by using the allocated downlink resource block and transmitting a signal by using the allocated uplink resource block.

A fourth aspect of the present invention resides in the method for controlling a wireless communication system of the third aspect, wherein the allocated uplink resource block is an uplink resource block for a normal subframe that immediately follows a subframe of the allocated downlink resource block.

A fifth aspect of the present invention resides in, in a wireless communication system which includes a mobile station and a base station and in which there might be a difference in a frequency band between a downlink resource and an uplink resource allocated to the mobile station, the base station including: a communicator that receives from the mobile station a message indicating that the mobile station includes the adaptive array antenna; and a controller that, upon receiving the message, assigns the same frequency band as a frequency band of a downlink resource block to be a frequency band of an uplink resource block following the downlink resource block, the downlink resource block and the uplink resource block being allocated to the mobile station.

A sixth aspect of the present invention resides in the base station of the fifth aspect, wherein the allocated uplink resource block is an uplink resource block for a normal subframe that immediately follows a subframe of the allocated downlink resource block.

A seventh aspect of the present invention resides in, in a wireless communication system which includes a mobile station and a base station and in which there might be a difference in a frequency band between a downlink resource and an uplink resource allocated to the mobile station, the mobile station including: a communicator that transmits to the base station a message indicating that the mobile station includes the adaptive array antenna; and a controller that calculates an antenna weight based on a reception signal received by using a downlink resource block allocated by the base station in response to the message and that controls the communicator to transmit a transmission signal by using an uplink resource block allocated by the base station, the allocated uplink resource block following the allocated downlink resource block and being assigned with a frequency band that is the same frequency band as a frequency band of the allocated downlink resource block.

An eighth aspect of the present invention resides in the mobile station of the seventh aspect, wherein the allocated uplink resource block is an uplink resource block for a normal subframe that immediately follows a subframe of the allocated downlink resource block.(Advantageous Effects of Invention)

According to a wireless communication system, a method for controlling a wireless communication system, a base station, and a mobile station according to the present invention, in wireless communication systems such as TD-LTE where there might be a difference in the frequency band allocated to a mobile station between the uplink and the downlink, the mobile station is capable of controlling the adaptive array antenna and ensuring desired antenna directivity.

BRIEF DESCRIPTION OF DRAWINGS

The present invention will be further described below with reference to the accompanying drawings, wherein.

DESCRIPTION OF EMBODIMENTS

In the following, embodiments of the present invention are described.

(Embodiment)

Figure 1:
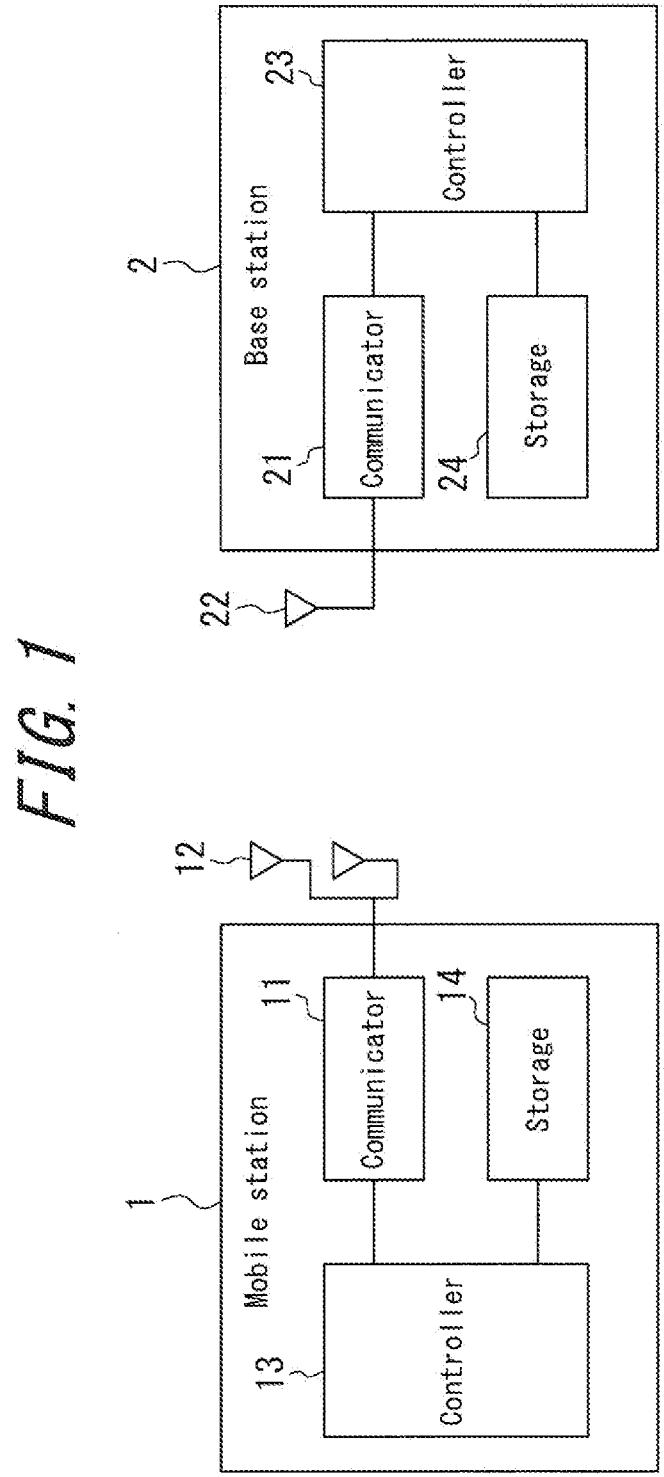
FIG. 1 is a block diagram of a wireless communication system according to one embodiment of the present invention.

FIG. 1 is a block diagram of a wireless communication system according to one embodiment of the present invention. The wireless communication system according to the one embodiment of the present invention includes a mobile station 1 and a base station 2. The mobile station 1 and the base station 2 wirelessly communicate with each other.

The mobile station 1 includes a communicator 11, an adaptive array antenna 12, a controller 13, and a storage 14.

The communicator 11 transmits and receives a signal to and from the base station 2 via the adaptive array antenna 12. The communicator 11 also transmits to the base station 2 a message indicating that the self mobile station includes the adaptive array antenna 12. The adaptive array antenna 12 is configured by using a plurality of antennas. Although FIG. 1 illustrates that the adaptive array antenna 12 includes two antenna elements, the present invention is not limited to this example, and the adaptive array antenna 12 may include three or more antenna elements.

The controller 13 performs various control with respect to the mobile station 1. For example, the controller 13 calculates an antenna weight of the adaptive array antenna 12 based on a downlink signal. The controller 13 also controls the communicator 11 to transmit an uplink signal with use of the calculated antenna weight.

The storage 14 stores a variety of data in the mobile station 1. For example, the storage 14 stores a variety of programs that are executed in the mobile station 1.

The base station 2 includes a communicator 21, an antenna 22, a controller 23, and a storage 24.

The communicator 21 transmits and receives a signal to and from the mobile station 1 via the antenna 22. The communicator 21 also receives a message from the mobile station 1. The antenna 22 may be configured by using a plurality of antenna elements or a single antenna element.

In accordance with the message received from the mobile station 1, the controller 23 allocates (schedules) wireless resources. The controller 23 transmits a result of the scheduling to the mobile station 1 via the communication unit 21. The controller 23 also controls the communicator 21 to transmit a downlink signal using the allocated downlink resource block and controls the mobile station 1 to transmit an uplink signal using the allocated uplink resource block.

The storage 24 stores a variety of data in the base station 2. For example, the storage 24 stores a variety of programs that are executed in the base station 2.

Figure 2:
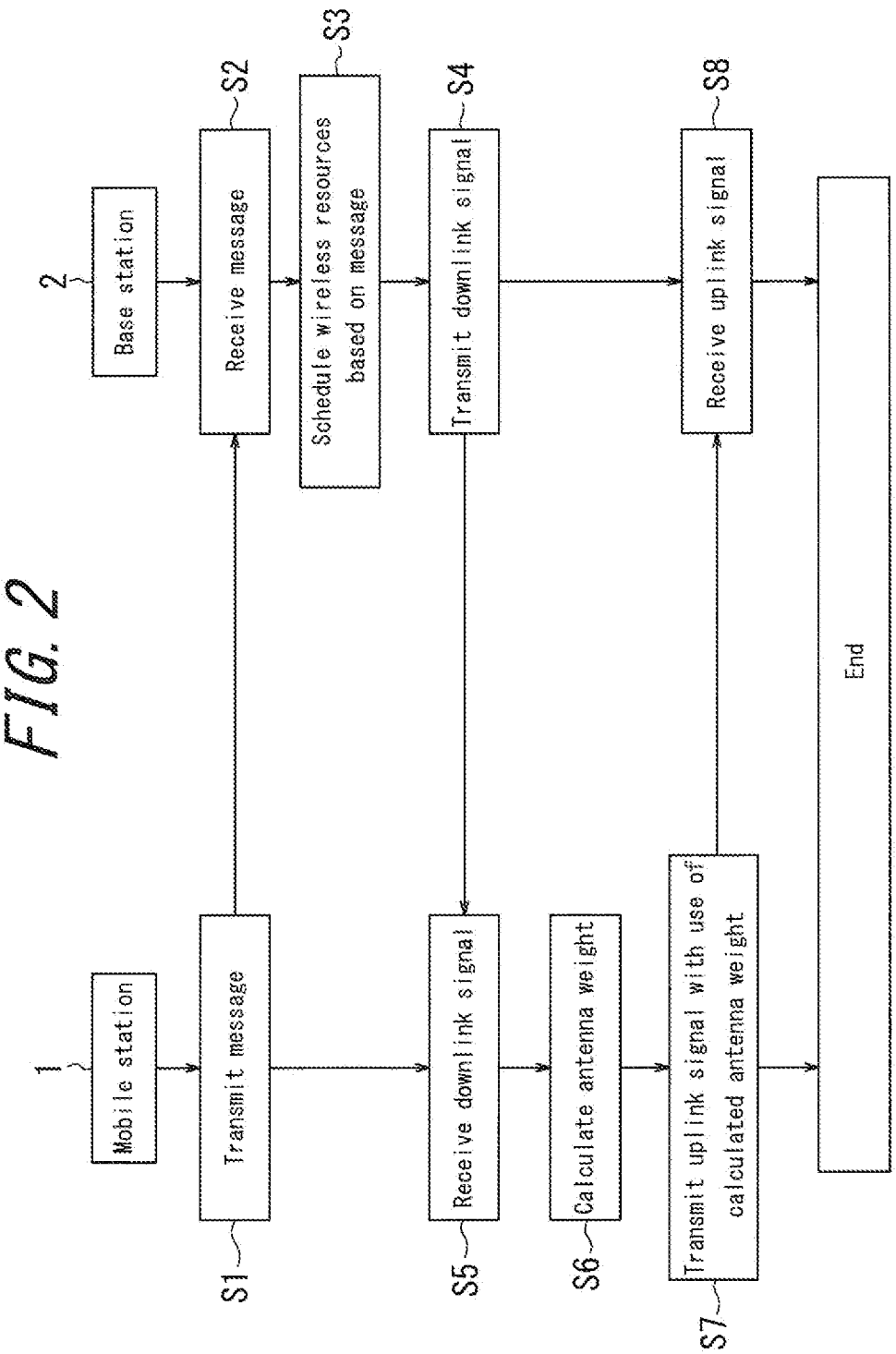
FIG. 2 is a flowchart illustrating operation of a wireless communication system according to one embodiment of the present invention.

Next, a description is given of operation of the wireless communication system according to one embodiment of the present invention with reference to the flowchart of FIG. 2.

Firstly, the controller 13 included in the mobile station 1 controls the communicator 11 to transmit, to the base station 2, a message indicating that the self mobile station includes the adaptive array antenna 12 (step S1). The communicator 11 transmits the message to the base station 2 via the adaptive array antenna 12. The communicator 21 included in the base station 2 receives the message via the antenna 22 (step S2).

Subsequently, in accordance with the received message, the controller 23 included in the base station 2 allocates wireless resources (step S3). In detail, the controller 23 assigns the same frequency band as a frequency band of a downlink resource block to be a frequency band of an uplink resource block following the downlink resource block, the downlink and the uplink resource block being allocated to the mobile station 1 associated with the received message.

Subsequently, the controller 23 included in the base station 2 controls the communicator 21 to transmit a downlink signal using the allocated downlink resource block (step S4). The communicator 21 transmits the downlink signal to the mobile station 1 via the antenna 22. At this time, the communicator 21 informs about the result of the scheduling together. The communicator 11 included in the mobile station 1 receives the downlink signal via the adaptive array antenna 12 (step S5). The communicator 11 passes the received signal to the controller 13.

Subsequently, the controller 13 calculates an antenna weight of the adaptive array antenna 12 based on the received signal (step S6). That is to say, the controller 13 calculates an antenna weight optimal for signal transmission in the frequency band of the resource block that the downlink signal has used. The controller 13 may store the calculated antenna weight in the storage 14.

Subsequently, the controller 13 controls the communicator 11 to transmit an uplink signal with use of the calculated antenna weight (step S7). The communicator 11 transmits the message to the base station 2 via the adaptive array antenna 12. In the uplink, the uplink resource block allocated in the step S3 is used. The communicator 21 included in the base station 2 receives the uplink signal via the antenna 22 (step S8), and processing ends.

Figure 3:
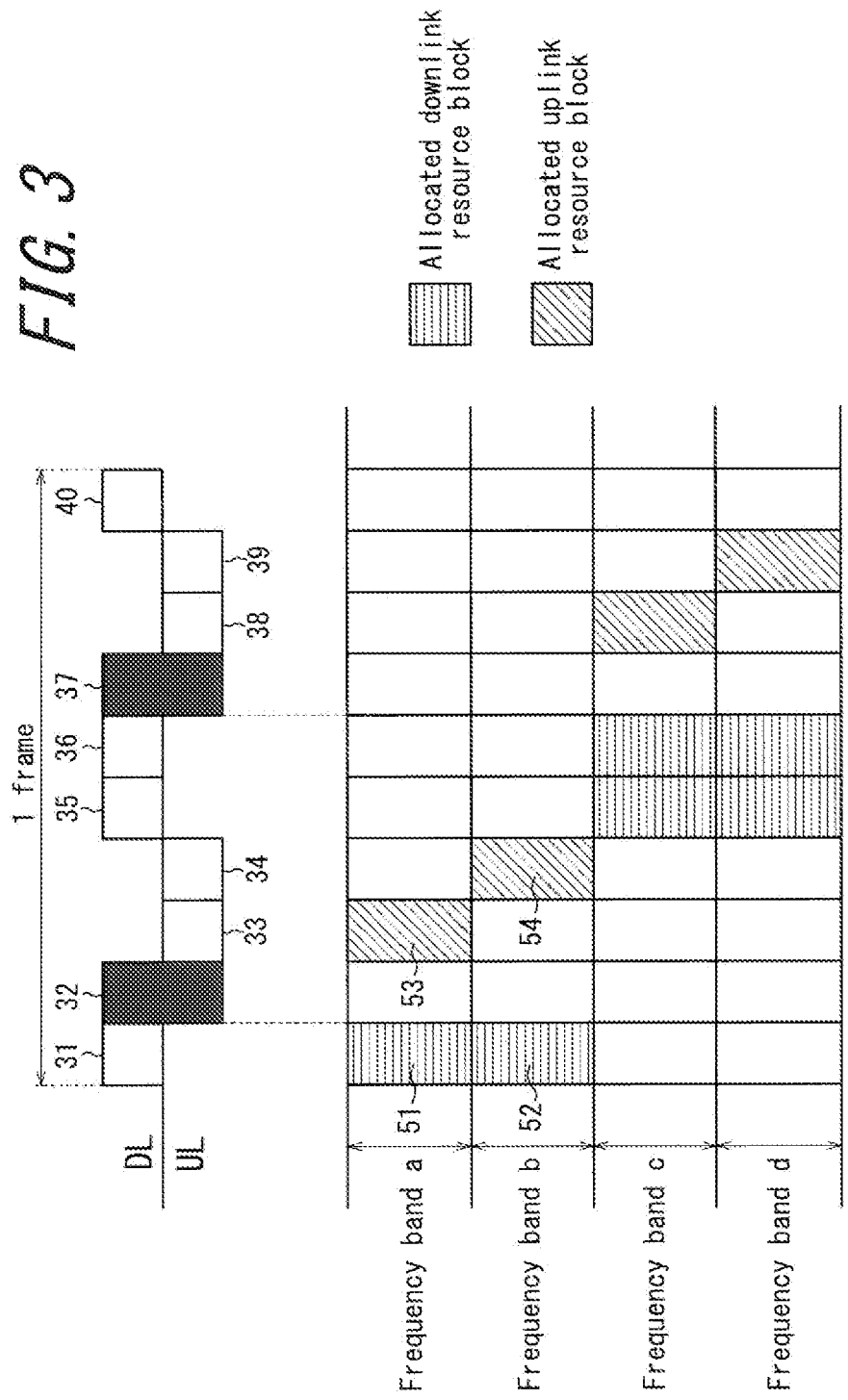
FIG. 3 is a schematic diagram illustrating allocation of resource blocks by a base station 2.

FIG. 3 is a schematic diagram illustrating allocation of resource blocks by the base station 2. The base station 2 allocates respective resource blocks in frequency bands a-d for subframes 31-40 to the mobile station 1 connected to the base station 2. Among the subframes 31-40, the subframe 32 and the subframe 37 are special subframes. The remaining subframes (subframes 31, 33-36, and 38-40) are normal subframes.

In FIG. 3, the resource blocks that the base station 2 allocates to the mobile station 1 are illustrated. The base station 2 allocates, for the subframe 31, the resource blocks 51 and 52 to the mobile station 1. The base station 2 allocates, for the subframe 33, the resource block 53 to the mobile station 1. The base station 2 allocates, for the subframe 34, the resource block 54 to the mobile station 1. The base station 2 similarly allocates the resource blocks for the subframes 35-40.

At this time, the base station 2 allocates the uplink and the downlink resource blocks while associating the uplink resource blocks with the downlink resource blocks. That is to say, the base station 2 assigns the same frequency band as a frequency band of a downlink resource block to be a frequency band of an uplink resource block. For example, in FIG. 3, the frequency bands of the resource block 51 and the resource block 52 are the frequency band a and the frequency band b, and the frequency bands of the resource block 53 and the resource block 54 that follow are the frequency band a and the frequency band b, which are the same as those in the downlink. Herein, the subframe of the uplink resource block 53 allocated to the mobile station 1 is a normal subframe that immediately follows the subframe of the downlink subframe 31. That is to say, the base station 2 allocates the resource blocks in the same frequency band a as for adjacent normal subframes. By thus allocating the resource blocks in the same frequency band a as for the adjacent normal subframes, based on the downlink in the frequency band a that is most closely adjacent in terms of time, calculation of the antenna weight and control of directivity are implemented with a very high precision.

Figure 4:
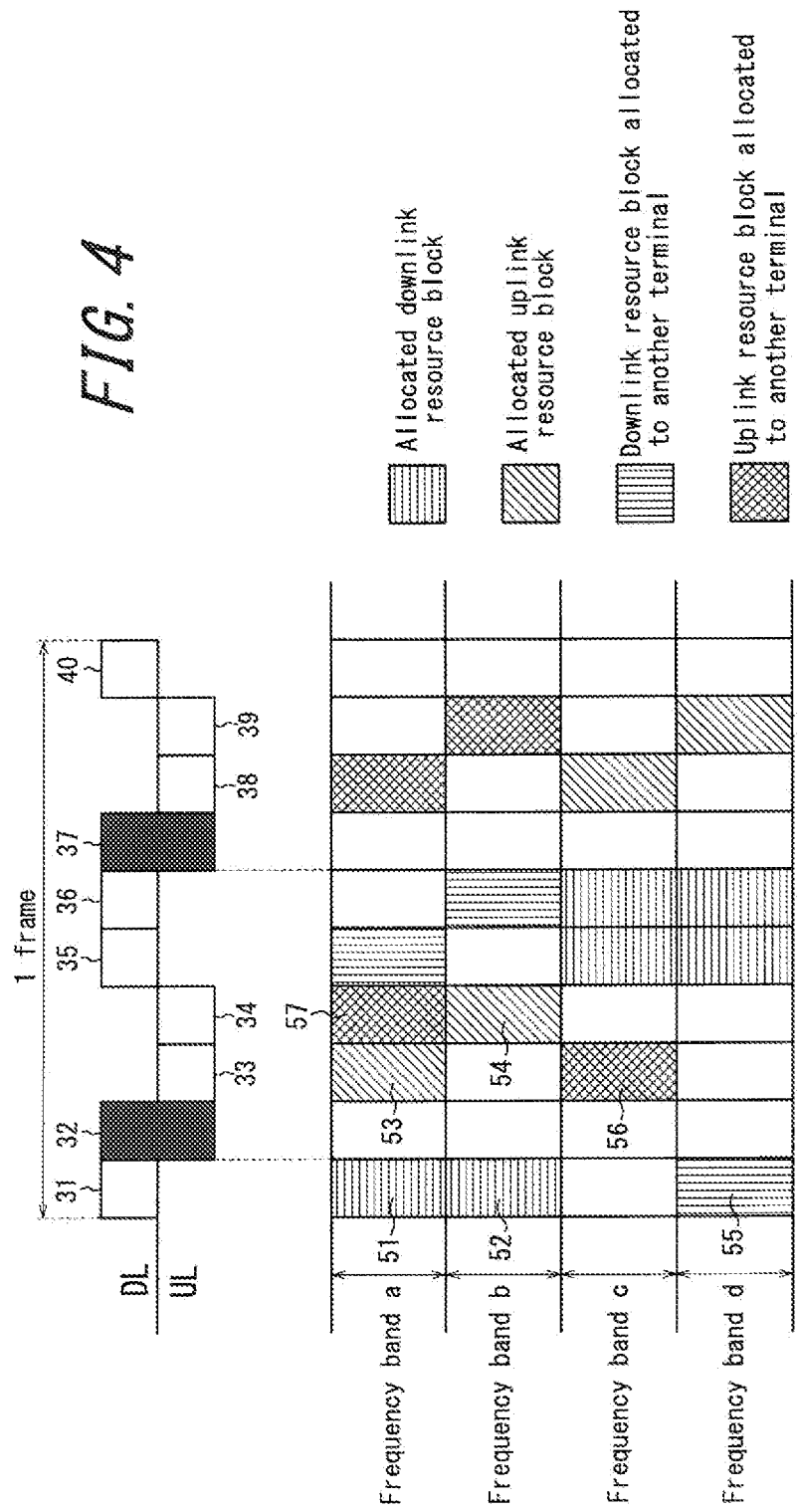
FIG. 4 is a schematic diagram illustrating details of allocation of resource blocks by the base station 2.
Figure 5:
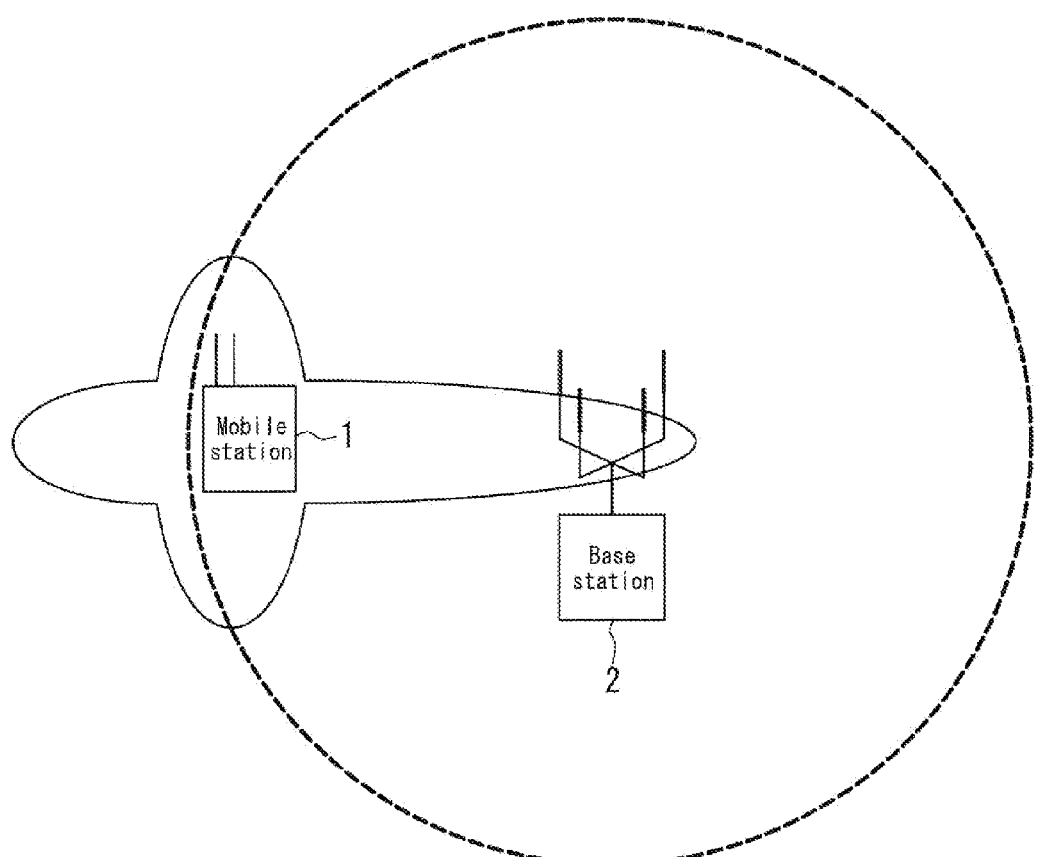
FIG. 5 is a schematic diagram when a mobile station 1 controls an adaptive array antenna 12 in a wireless communication system according to one embodiment of the present invention.

FIG. 4 is a schematic diagram illustrating details of allocation of resource blocks by the base station 2. FIG. 5 illustrates allocation of resource blocks when there is another mobile station 1 (another terminal) connected to the base station 2. In the following description, it is assumed that the other terminal does not include an adaptive array antenna.

Upon receiving the message in the step S2, the controller 23 included in the base station 2 prioritizes allocation to the mobile station 1 including the adaptive array antenna 12. In other words, the base station 2 prioritizes allocation of the resource blocks 51-54 over the other terminal. The method for allocating the resource blocks 51-54 is the same as the method illustrated in FIG. 3, and a description thereof is omitted.

Subsequently, the controller 23 included in the base station 2 separately allocates the uplink and downlink resource blocks to the other terminal without associating the uplink resource blocks with the downlink resource blocks. Accordingly, there might be a difference in the frequency band between the uplink resource blocks and the downlink resource blocks. In FIG. 4, the base station 2 allocates the downlink resource block 55 to the other terminal. Then, the base station 2 allocates the uplink resource blocks 56 and 57 to the other terminal. The frequency band of the downlink resource block 55 is the frequency band d, and the frequency bands of the uplink resource blocks 56 and 57 are different, namely, the frequency bands c and a, respectively.

FIG. 5 is a schematic diagram when the mobile station 1 controls the adaptive array antenna 12 in a wireless communication system according to the present invention. The frequency bands of the downlink resource blocks are the same as the frequency bands of the uplink resource blocks following the downlink resource blocks, the down link resource blocks and the uplink resource blocks being allocated to the mobile station 1. As a result, the adaptive array antenna 12 controlled by the mobile station 1 according to the present invention has a directivity optimal for signal transmission. Accordingly, a beam of the mobile station 1 is directed toward the base station 2.

As described above, according to the present invention, the base station 2 assigns downlink resource blocks and uplink resource blocks following the downlink resource blocks to be within the same frequency bands, the downlink resource blocks and the uplink resource blocks being allocated by the base station 2 to the mobile station 1. Then, the mobile station 1 calculates the antenna weight with use of the frequency bands of the allocated downlink resource blocks for controlling the adaptive array antenna 12. As a result, desired antenna directivity is ensured.

(Modified Example)

Figure 6:
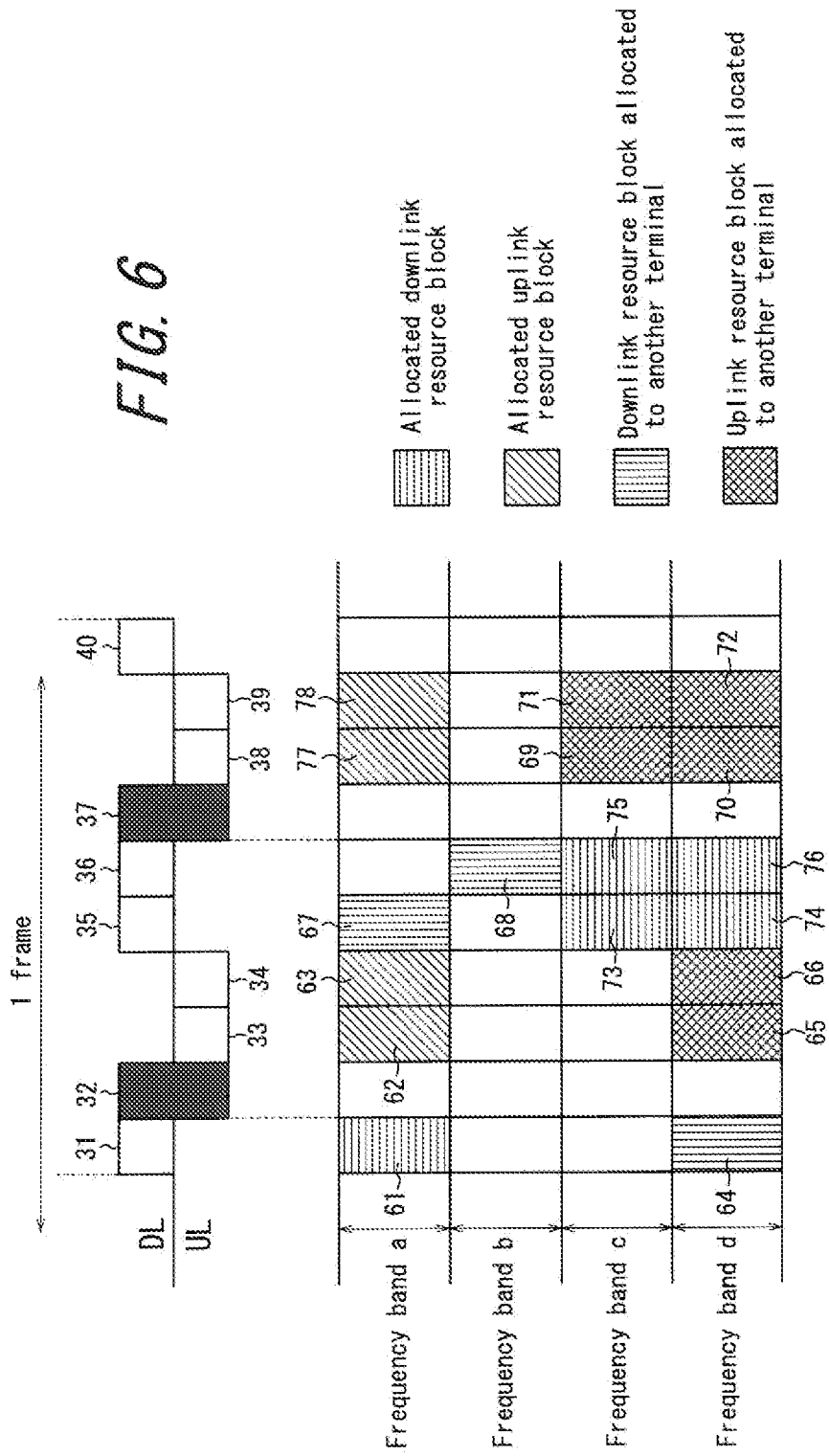
FIG. 6 is a schematic diagram illustrating a modified example of allocation of resource blocks by the base station 2.
Figure 7:
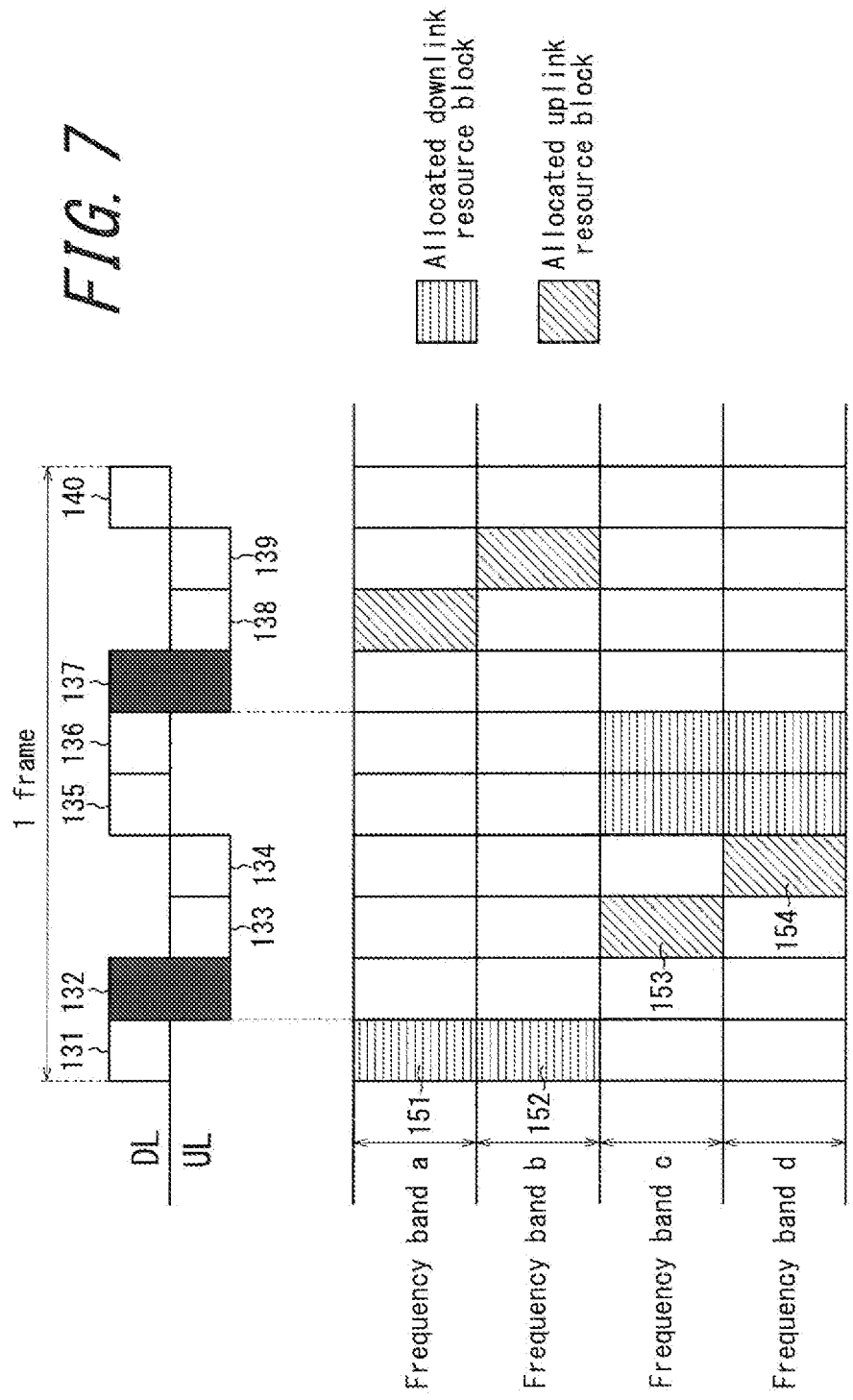
FIG. 7 is a schematic diagram illustrating allocation of resource blocks by a base station 102 in a conventional wireless communication system.
Figure 8:
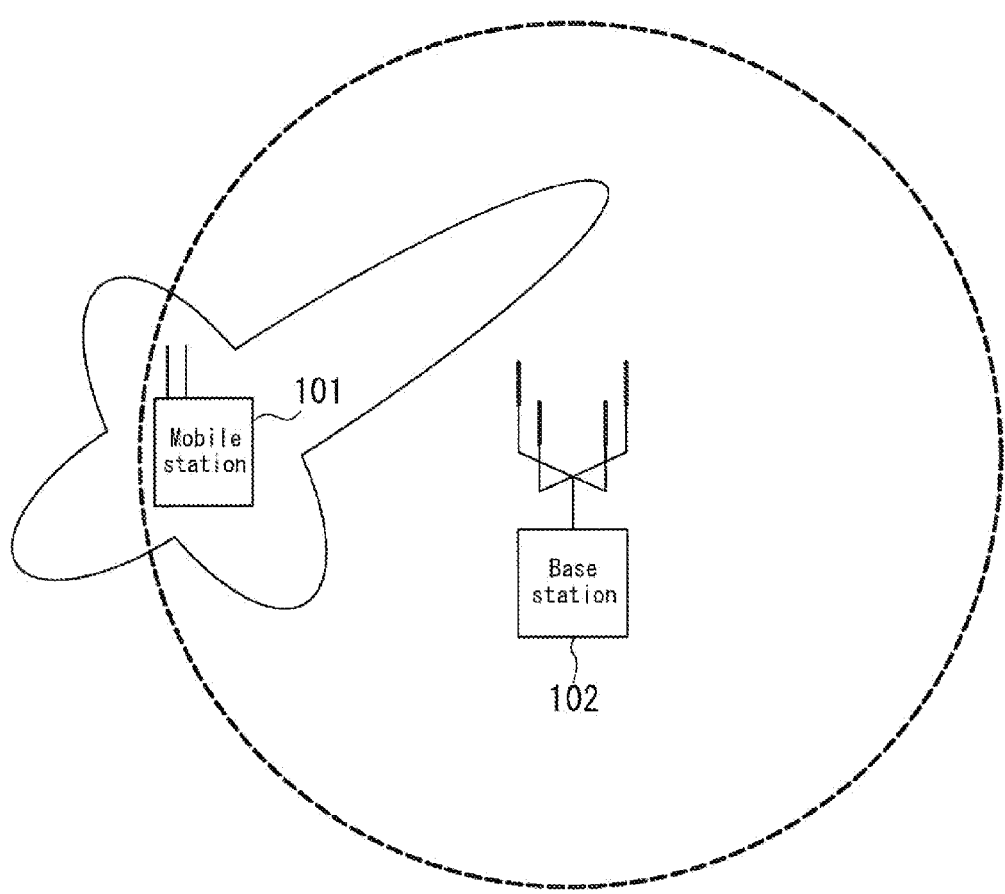
FIG. 8 is a schematic diagram when a mobile station 101 controls an adaptive array antenna in a conventional wireless communication system.

FIG. 6 is a schematic diagram illustrating a modified example of allocation of resource blocks by the base station 2. The example schematically represents a case where there is yet another terminal assigned with a higher priority than the mobile station 1. The other terminal assigned with the higher priority is, for example, a terminal of a premium user that preferentially uses a resource block of the best communication quality. In such a case, the base station 2 might not be able to allocate, to the mobile station 1, resource blocks in the same frequency band a as for adjacent normal subframes.

In the above circumstance, the controller 23 included in the base station 2 assigns the same frequency as a frequency band of one downlink resource block that is most closely adjacent in terms of time, among the downlink resource blocks that have been allocated to the mobile station 1, to be a frequency band of an uplink resource block. That is to say, when it is impossible to allocate resource blocks in the same frequency band a as for adjacent normal subframes, the base station 2 assigns the same frequency band as a frequency band of a downlink resource block to be a frequency band of an uplink resource block that follows the downlink resource block and that is most closely adjacent to the downlink resource block in terms of time.

A detailed description is given below with reference to FIG. 6. The controller 23 included in the base station 2 allocates, to the mobile station 1, a downlink resource block 61 and uplink resource blocks 62 and 63 that are in the same frequency band. The controller 23 included in the base station 2 also allocates, to the other terminal, a downlink resource block 64 and uplink resource blocks 65 and 66. Furthermore, the base station 2 preferentially allocates, to the other terminal, downlink resource blocks 67 and 68 and uplink resource blocks 69-72.

Subsequently, the controller 23 included in the base station 2 allocates, to the mobile station 1, downlink resource blocks 73-76. Herein, the frequency bands of the resource blocks 73-76 are the frequency band c and the frequency band d. However, the resource blocks 69-72, which are the uplink resource blocks in the frequency band c and the frequency band d, have been already allocated to the other terminal.

In the above circumstance, the controller 23 included in the base station 2 assigns the same frequency band as a frequency band of the downlink resource block that is most closely adjacent in terms of time to be a frequency band of an uplink resource block. That is to say, the controller 23 included in the base station 2 allocates, to the mobile station 1, uplink resource blocks 77 and 78 that are in the same frequency band as the frequency band (frequency band a) of the downlink resource block 61 that is most closely adjacent in terms of time. Then, in accordance with the antenna weight calculated based on a signal of the downlink resource block 61, the mobile station 1 transmits an uplink signal. By using the frequency band of the downlink resource block that is most closely adjacent in terms of time, calculation of the antenna weight and control of directivity are implemented with a relatively high precision.

Although the present invention has been described based on the drawings and the embodiments thereof, it should be noted that a person skilled in the art may easily make various changes and modifications according to the present disclosure. Therefore, such changes and modifications are to be understood as included within the scope of the present invention. For example, functions and the like included in various means, steps, or the like may be rendered in any logically consistent way. Furthermore, means and steps may be combined into one or divided.

REFERENCE SIGNS 1 mobile station
11 communicator
12 adaptive array antenna
13 controller
14 storage
2 base station
21 communicator
22 antenna
23 controller
24 storage
31-40 subframe
51-57, 61-72 resource block
131-140 subframe
151-154 resource block

The invention claimed is:

1. A method for controlling a wireless communication system which includes a mobile station and a base station and in which there might be a difference in a frequency band between a downlink resource and an uplink resource allocated to the mobile station, the mobile station including an adaptive array antenna, the method comprising:
   the step, performed by the mobile station, of transmitting to the base station a message indicating that the mobile station includes the adaptive array antenna;
   the step, performed by the base station in response to receiving the message, of assigning the same frequency band as a frequency band of a downlink resource block to be a frequency band of an uplink resource block following the downlink resource block, the downlink resource block and the uplink resource block being allocated to the mobile station; and
   the step, performed by the mobile station, of controlling directivity of the adaptive array antenna based on a signal received by using the allocated downlink resource block and transmitting a signal by using the allocated uplink resource block.

2. The method for controlling a wireless communication system of claim 1, wherein the allocated uplink resource block is an uplink resource block for a normal subframe that immediately follows a subframe of the allocated downlink resource block.

3. In a wireless communication system which includes a mobile station and a base station and in which there might be a difference in a frequency band between a downlink resource and an uplink resource allocated to the mobile station, the base station comprising:
  a communicator that receives from the mobile station a message indicating that the mobile station includes the adaptive array antenna; and
  a controller that, in response to receiving the message, assigns the same frequency band as a frequency band of a downlink resource block to be a frequency band of an uplink resource block following the downlink resource block, the downlink resource block and the uplink resource block being allocated to the mobile station.

4. The base station of claim 3, wherein the allocated uplink resource block is an uplink resource block for a normal subframe that immediately follows a subframe of the allocated downlink resource block.

5. In a wireless communication system which includes a mobile station and a base station and in which there might be a difference in a frequency band between a downlink resource and an uplink resource allocated to the mobile station, the mobile station comprising:
  a communicator that transmits to the base station a message indicating that the mobile station includes the adaptive array antenna; and
  a controller that calculates an antenna weight based on a reception signal received by using a downlink resource block allocated by the base station in response to the message and that controls the communicator to transmit a transmission signal by using an uplink resource block allocated by the base station, the allocated uplink resource block following the allocated downlink resource block and being assigned with a frequency band that is the same frequency band as a frequency band of the allocated downlink resource block.

6. The mobile station of claim 5, wherein the allocated uplink resource block is an uplink resource block for a normal subframe that immediately follows a subframe of the allocated downlink resource block.

* * * * *